W. M. UPDEGRAVE AND A. S. RYESKY.
SPECTACLE FRAME.
APPLICATION FILED AUG. 23, 1919.
1,381,603.
Patented June 14, 1921.
2 SHEETS—SHEET 1.
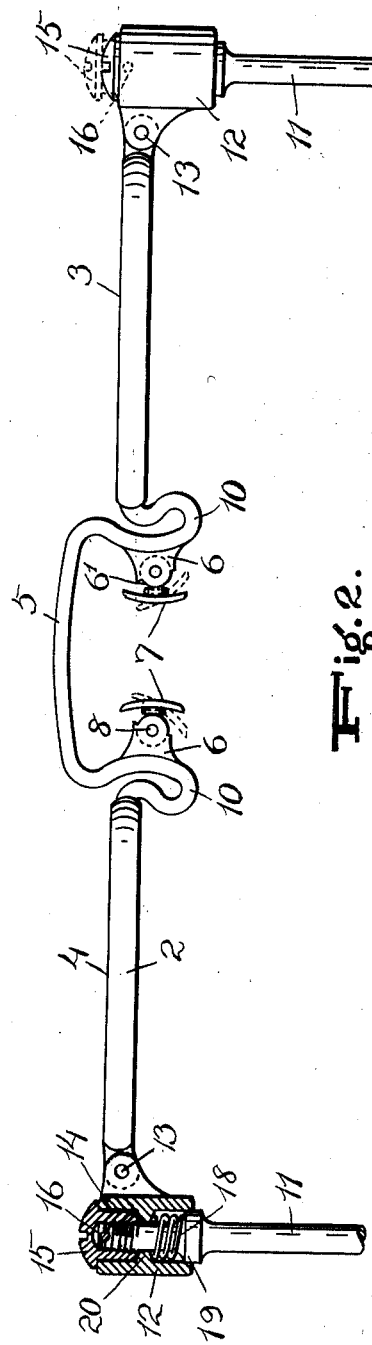
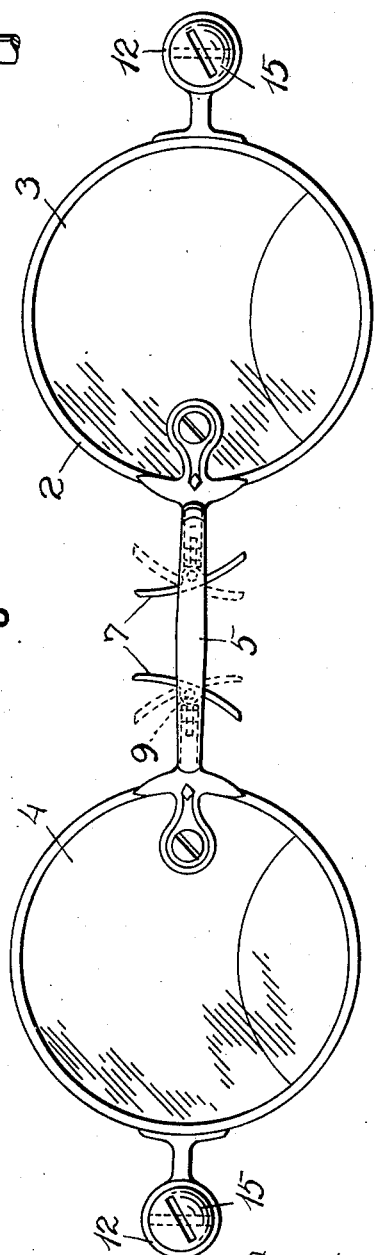
Inventors
W. M. Updegrave,
A. S. Ryesky,
By E. W. Anderson
Attorneys W. M. UPDEGRAVE AND A. S. RYESKY.
SPECTACLE FRAME.
APPLICATION FILED AUG. 23, 1919.
1,381,603.
Patented June 14, 1921.
2 SHEETS—SHEET 2.
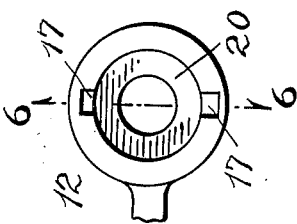
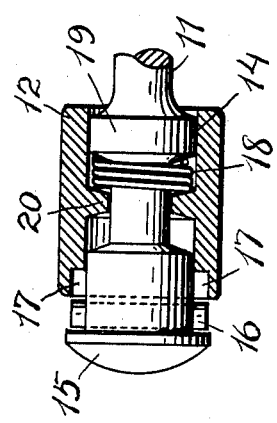
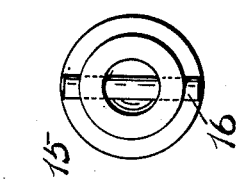
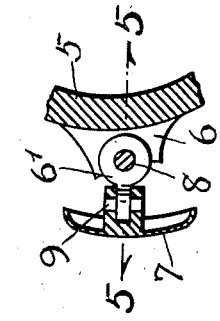
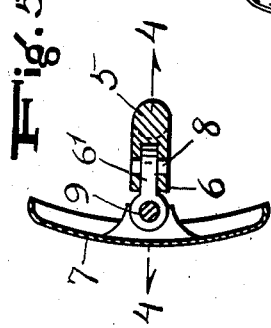
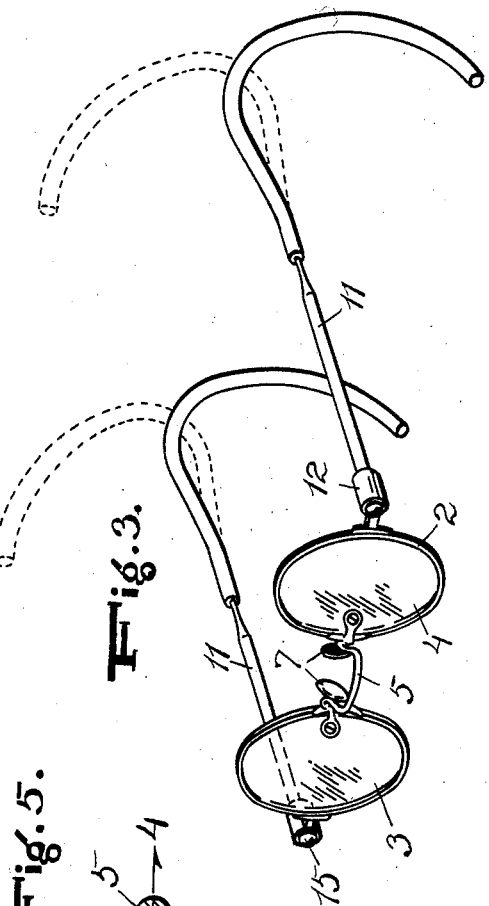

UNITED STATES PATENT OFFICE.

WILLIAM M. UPDEGRAVE AND ALEXANDER S. RYESKY, OF JOHNSTOWN, PENNSYLVANIA.

SPECTACLE-FRAME.

1,381,603.  Specification of Letters Patent.  Patented June 14, 1921.

Application filed August 23, 1919. Serial No. 319,395.

*To all whom it may concern:*

Be it known that we, WILLIAM M. UPDEGRAVE, a citizen of the United States, resident of Johnstown, in the county of Cambria and State of Pennsylvania, and ALEXANDER S. RYESKY, a citizen of Russia, and resident of Johnstown, in the county of Cambria and State of Pennsylvania, have made a certain new and useful Invention in Spectacle-Frames; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention on an enlarged scale, showing the temples broken away.

Fig. 2 is a front view of the invention, also enlarged.

Fig. 3 is a perspective view of the invention, the reversed position of the temples being shown in dotted lines.

Fig. 4 is a detail sectional view of the joint of the bridge and nose rests, the section being taken on line 4—4, Fig. 5.

Fig. 5 is a detail sectional view on the line 5—5, Fig. 4.

Fig. 6 is a detail sectional view of the joint between the temple and the lens connection, on line 6—6, Fig. 7.

Fig. 7 is a detail front view of a joint member.

Fig. 8 is a detail rear view of a head of the inner end of a temple.

The invention has relation to spectacle frames, having for its object to provide means in connection therewith whereby the spectacle frame is adapted for reversal to bring the lens of one eye opposite the other eye. One lens for distance purposes may be in this way substituted at the same side of the frame by the other or reading lens for those people unfortunate in having but a single eye. The reversal of the spectacle frame is also found useful for those having both eyes alike and consequently using bifocal lenses of such character that the lens for one eye will serve equally well for the other eye, and vice versa, the reading lenses being thereby raised sufficiently so as not to interfere with the vision through the distance lenses, the reason for this reversal being that with many people the reading lenses of bifocal glasses are continually interfering with the vision through the distance lenses, or in other words, they cannot become accustomed to using the bifocal lenses when walking, for instance. Other objects and advantages will hereinafter appear.

The invention consists in the novel construction and combinations of parts, as hereinafter set forth.

In the accompanying drawings illustrating the invention, the numeral 2 designates a spectacle frame, having right and left lenses 3 and 4 connected through bridge 5, which is horizontal and is provided with lateral studs 6, whereon are pivoted at 6', oblique nose rests 7, which are adapted to be pivotally turned through a short arc to opposite inclination when the frame is reversed, as shown in dotted lines in Fig. 3 of the drawings. The pivots 6' are preferably universal joints having double pivot pins 8 and 9 at right angles to each other whereby the nose rests may also be adjusted inwardly and outwardly as well as upwardly and downwardly to fit the nose of the wearer.

The bridge 5 is joined to the lens rims (or lens clips in the case of rimless glasses) by loops or bends 10, the branches of which may be either contracted or spread to enable the lenses to be spaced apart by varying distances to accommodate people having eyes differently spaced apart. The temple 11 is connected to the lens rim or lens clip through the medium of a joint member 12, pivoted to the rim by a pin 13 at right angles to the plane of the lens, the inner end of the temple being rotatably mounted at 14 within said joint member whereby the temple may be pivotally turned through an arc of 180 degrees in being reversed.

Means are provided whereby the temple is normally and upon reversal secured or retained in position against being accidentally or unintentionally rotated or pivotally moved consisting preferably of a head 15 of the inner end of the temple, carrying a radial pin 16, the latter normally engaging an open end seat 17 of the joint member. When it is desired to reverse the spectacle frame, the temple is pressed endwise slightly to disengage the pin 16 from its seat 17, as shown in Fig. 6, against the tension of a coiled spring 18 located between a collar 19 of the temple and an annular inwardly extending flange 20 of the joint member, said spring being compressed and serving upon release of the temple after reversal is completed, to automatically engage the pin 16 with another and diametrically opposite seat 17 of the joint member. The pins 16 may be provided in duplicate, as shown. The head 15 is a screw head, and the head of the screw is adapted to and normally closes one end of the cavity of the joint member, the collar 19 closing the other end of said cavity and confining the spring 18 therein between the collar and the flange 20.

We claim:

1. A reversible spectacle frame having a horizontal bridge, and adjustable nose rests, and temples provided each with a pivotal connection with said frame and capable of rotatable movement about its axis through an arc of 180 degrees in reversal, said connection being adapted to lock the temple in normal position and in adjusted position and being releasable prior to adjustment.

2. A reversible spectacle frame, having a horizontal bridge and nose rests adjustable to either of two inclined positions, and temples provided each with a pivotal connection with said frame in line with and capable of rotatable movement about its axis including a joint member having diametrically opposite seats, and a spring retracted head having a lug normally engaging one of said seats and capable of release therefrom and engagement with the other seat.

3. A reversible spectacle frame, having temples each capable of rotatable adjustment about its axis through an arc of 180 degrees, and means for locking the temples in normal position and in adjusted position.

4. A reversible spectacle frame having temples each capable of rotatable adjustment about its axis through an arc of 180 degrees, and spring tensioned releasable means for locking the temples in normal and in adjusted position.

In testimony whereof, we affix our signatures in presence of two witnesses.

WILLIAM M. UPDEGRAVE.
ALEXANDER S. RYESKY.

Witnesses:
   JAMES A. GRAHAM,
   EDITH E. MURPHY.